United States Patent
Populus

(10) Patent No.: US 8,396,419 B2
(45) Date of Patent: Mar. 12, 2013

(54) DEVICE FOR FLEXIBLE WIDEBAND FREQUENCY TRANSPOSITION, AND ASSOCIATED SATELLITE REMOTE CONTROL RECEIVER

(75) Inventor: Thierry Populus, Fontenilles (FR)

(73) Assignee: Thales, Neuilly sur Seine (FR)

( * ) Notice: Subject to any disclaimer, the term of this patent is extended or adjusted under 35 U.S.C. 154(b) by 163 days.

(21) Appl. No.: 13/108,848

(22) Filed: May 16, 2011

(65) Prior Publication Data

US 2011/0287711 A1   Nov. 24, 2011

(30) Foreign Application Priority Data

May 21, 2010 (FR) ...................... 10 02153

(51) Int. Cl.
*H04B 7/185* (2006.01)
(52) U.S. Cl. ....... 455/12.1; 455/131; 455/207; 455/260; 455/313; 375/316; 375/240
(58) Field of Classification Search ................ 455/12.1, 455/3.02, 13.1, 131, 165.1, 207, 209, 260, 455/313; 375/133, 316, 240, 347; 370/484
See application file for complete search history.

(56) References Cited

U.S. PATENT DOCUMENTS

| | | | |
|---|---|---|---|
| 8,184,048 B2 * | 5/2012 | Yoo et al. ................ | 342/357.73 |
| 2007/0087714 A1 | 4/2007 | Chang | |
| 2007/0224961 A1 | 9/2007 | Suzuki | |

FOREIGN PATENT DOCUMENTS

WO   03/023985 A1   3/2003

\* cited by examiner

*Primary Examiner* — Shaima Q Aminzay
(74) *Attorney, Agent, or Firm* — Baker Hostetler LLP

(57) ABSTRACT

A device for double frequency transposition includes means for controlling the frequencies $F_{OL1}$, $F_{OL2}$ of a first and a second synthesizer, which are adapted to carry out the steps of (a) initializing the frequency $F_{OL2}$ at a first given value $F_{OL2,A}$; and (b) for a given pair of frequencies $F_{RF}$, $F_{FI2}$, determining the frequency $F_{OL1}$ with the aid of the following relations:

$$\text{if } F_{RF} > F_{OL1} \text{ and } F_{FI1} < F_{OL2}, F_{RF} = F_{OL1} + F_{OL2} - F_{FI2} \qquad (5),$$

$$\text{if } F_{RF} > F_{OL1} \text{ and } F_{FI1} > F_{OL2}, F_{RF} = F_{OL1} + F_{OL2} + F_{FI2} \qquad (6),$$

$$\text{if } F_{RF} < F_{OL1} \text{ and } F_{FI1} > F_{OL2}, F_{RF} = F_{OL1} - F_{OL2} - F_{FI2} \qquad (7),$$

$$\text{if } F_{RF} < F_{OL1} \text{ and } F_{FI1} < F_{OL2}, F_{RF} = F_{OL1} - F_{OL2} + F_{FI2} \qquad (8);$$

and (c) if the value obtained for $F_{OL1}$ lies in a frequency band of lower bound $A \cdot F_{REF} - B \cdot X$ and upper bound $A \cdot F_{REF} + B \cdot X$, where A is a strictly positive integer and X is a given parameter, modifying the frequency $F_{OL2}$ to a second value $F_{OL2,B}$ determined so that the difference in absolute value between $F_{OL2,A}$ and $F_{OL2,B}$ satisfies the following two conditions:

$$|F_{OL2,B} - F_{OL2,A}| > AF_{REF} + 2B \cdot X$$

$$|F_{OL2,B} - F_{OL2,A}| < AF_{REF} - 2B \cdot X;$$

and (d) transmitting the frequency values $F_{OL1}$ and $F_{OL2}$ to said frequency synthesizers.

4 Claims, 6 Drawing Sheets

| N | K | N+K/M | FOL1 (MHz) | Parasitic frequencies (MHz) |
|---|---|---|---|---|
| 60 | 0 | 60.00000 | 3000.0000 | 3000 |
| 60 | 1 | 60.00001 | 3000.0005 | 3000 and 3000.001 |
| 60 | 10 | 60.00010 | 3000.0050 | 3000 and 3000.01 |
| 60 | 100 | 60.00100 | 3000.0500 | 3000 and 3000.1 |
| 60 | 50000 | 60.50000 | 3025.0000 | 3000 and 3050 |
| 60 | 99999 | 60.99999 | 3049.9995 | 3049.9990 and 3050 |
| 61 | 0 | 61.00000 | 3050.0000 | 3050 |
| 61 | 1 | 61.00001 | 3050.0005 | 3050 and 3050.0010 |
| 79 | 99999 | 79.99999 | 3999.9995 | 3999.9990 and 4000 |
| 80 | 0 | 80.00000 | 4000.0000 | 4000 |

FIG.3

| $F_{RF}$ (MHz) | $F_{OL1}$ (MHz) | $F_{OL2}$ (MHz) | $F_{FI2}$ (MHz) |
|---|---|---|---|
| 4000.0000 | 3190.0000 | 910.0 | 100.0 |
| 4005.0000 | 3195.0000 | 910.0 | 100.0 |
| 4006.0000 | 3206.0000 | 900.0 | 100.0 |
| 4044.0000 | 3244.0000 | 900.0 | 100.0 |
| 4045.0000 | 3235.0000 | 910.0 | 100.0 |
| 4055.0000 | 3245.0000 | 910.0 | 100.0 |
| 4056.0000 | 3256.0000 | 900.0 | 100.0 |
| 4094.0000 | 3294.0000 | 900.0 | 100.0 |
| 4095.0000 | 3285.0000 | 910.0 | 100.0 |
| 4105.0000 | 3295.0000 | 910.0 | 100.0 |
| 4106.0000 | 3306.0000 | 900.0 | 100.0 |
| 4495.0000 | 3695.0000 | 900.0 | 100.0 |
| 4496.0000 | 3686.0000 | 910.0 | 100.0 |
| 4500.0000 | 3690.0000 | 910.0 | 100.0 |

FIG.6

DEVICE FOR FLEXIBLE WIDEBAND FREQUENCY TRANSPOSITION, AND ASSOCIATED SATELLITE REMOTE CONTROL RECEIVER

CROSS-REFERENCE TO RELATED APPLICATION

This application claims priority to foreign French patent application No. FR 1002153, filed on May 21, 2010, the disclosure of which is incorporated by reference in its entirety.

FIELD OF THE INVENTION

The present invention relates to a double frequency transposition device for a radio receiver, in particular for a satellite remote control receiver, and to a satellite remote control receiver comprising such a device.

BACKGROUND

A satellite remote control receiver is located on board a geostationary or non-geostationary satellite and implements a link for remote control and distance measurement between the ground stations and said satellite, which is known by the term TTC link for "Telemetry, Tracking and Command".

The known solutions of TTC receiver architectures use a local oscillator, most often delivering a fixed frequency or a restricted number of frequencies. By varying the frequency of the local oscillator or oscillators, flexibility of the reception frequency of the receiver is obtained. This frequency can be made programmable and remotely controllable by using a local integer or fractional frequency synthesis oscillator.

The use of a synthesizer of the known fractional type combines the advantages of very wideband frequency coverage while ensuring a very fine frequency selection increment. This possibility of reconfiguring the frequency of a TTC receiver makes it possible, for example, to coordinate the frequencies of a plurality of satellites during a change of orbital position or to avoid using certain frequencies which experience interference.

One of the major drawbacks of using a fractional synthesizer in TTC receiver architectures is due to the degradation of performances for certain predefined frequency bands.

SUMMARY OF THE INVENTION

It is in particular an object of the present invention to resolve the limitations of known fractional synthesizers by suppressing the forbidden frequency bands inherent to such devices. The solution provided by the invention uses the frequency flexibility of a second local frequency synthesis oscillator which the receiver according to the invention comprises. By suitable simultaneous control of the two local oscillators, the forbidden frequency bands of a fractional synthesizer can be avoided in order to allow the receiver to cover a very wide frequency band without discontinuity.

To this end, the invention relates to a device for double frequency transposition, comprising at least one first amplification and filtering chain receiving a signal at a first frequency $F_{RF}$, a first frequency mixer which carries out a first frequency transposition of said signal to a first intermediate frequency $F_{FI1}$ and delivers said transposed signal to the input of a second amplification and filtering chain, a second frequency mixer which carries out a second transposition of the signal delivered by said second chain to a second intermediate frequency $F_{FI2}$ and delivers said transposed signal to the input of a third amplification and filtering chain, a first fractional frequency synthesizer of loop band B adapted to produce a first synthesized frequency $F_{OL1}$ at the input of said first mixer and a second integer or fractional frequency synthesizer adapted to produce a second synthesized frequency $F_{OL2}$ at the input of said second mixer, characterized in that it furthermore comprises means for controlling the frequencies $F_{OL1}$, $F_{OL2}$ of said first and second synthesizers, which are adapted to carry out the following steps:

Initializing the frequency $F_{OL2}$ at a first given value $F_{OL2,A}$,
For a given pair of frequencies ($F_{RF}$, $F_{FI2}$), determining the frequency $F_{OL1}$ with the aid of the following relations:

If $F_{RF} > F_{OL1}$ and $F_{FI1} < F_{OL2}$, $F_{RF} = F_{OL1} + F_{OL2} - F_{FI2}$     (5), If $F_{RF} > F_{OL1}$ and $F_{FI1} > F_{OL2}$, $F_{RF} = F_{OL1} + F_{OL2} + F_{FI2}$     (6), If $F_{RF} < F_{OL1}$ and $F_{FI1} > F_{OL2}$, $F_{RF} = F_{OL1} - F_{OL2} - F_{FI2}$     (7), If $F_{RF} < F_{OL1}$ and $F_{FI1} < F_{OL2}$, $F_{RF} = F_{OL1} - F_{OL2} + F_{FI2}$     (8), If the value obtained for $F_{OL1}$ lies in a frequency band of lower bound $A \cdot F_{REF} - B \cdot X$ and upper bound $A \cdot F_{REF} + B \cdot X$, where A is a strictly positive integer and X is a given parameter, modifying the frequency $F_{OL2}$ to a second value $F_{OL2,B}$ determined so that the difference in absolute value between $F_{OL2,A}$ and $F_{OL2,B}$ satisfies the following two conditions:

$$|F_{OL2,B} - F_{OL2,A}| > \Delta F_{REF} + 2B \cdot X$$

$$|F_{OL2,B} - F_{OL2,A}| < \Delta F_{REF} - 2B \cdot X$$

Transmitting the frequency values $F_{OL1}$ and $F_{OL2}$ to said frequency synthesizers.

In one alternative embodiment of the invention, said means for controlling the frequencies $F_{OL1}$, $F_{OL2}$ are adapted to carry out initially, for a set of given frequency pairs $F_{RF}$, $F_{FI2}$, said calculation steps for determining the associated values of the frequencies $F_{OL1}$, $F_{OL2}$ of said frequency synthesizers and to record the set of frequencies $F_{RF}$, $F_{FI2}$, $F_{OL1}$, $F_{OL2}$ obtained in a memory which they comprise.

In another alternative embodiment of the invention, said means for controlling the frequencies $F_{OL1}$, $F_{OL2}$ are formed by an integrated circuit of the ASIC or FPGA type comprising at least one memory.

The invention also relates to a remote control receiver for a geostationary satellite, comprising at least means for demodulating a signal at the intermediate frequency $F_{FI2}$ and a double transposition device according to the invention which receives a signal at the frequency $F_{RF}$ and delivers said transposed signal at the intermediate frequency $F_{FI2}$.

BRIEF DESCRIPTION OF THE DRAWINGS

Other characteristics will become apparent on reading the following detailed description given by way of example and without limitation, and provided with reference to the appended drawings in which:

FIG. 3 represents a numerical application table illustrating the relation between the frequency $F_{OL1}$ and the parasitic frequencies induced by using a fractional synthesizer, FIG. 6 represents a numerical application table illustrating the determination of the frequencies $F_{OL1}$ and $F_{OL2}$.

DETAILED DESCRIPTION

Figure 1:
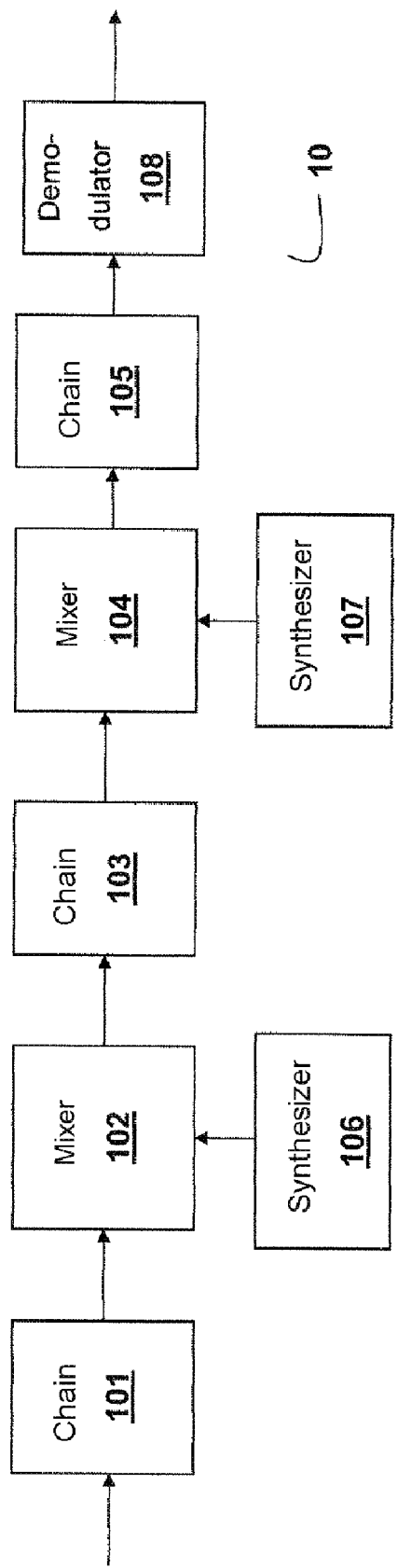
FIG. 1 represents a block diagram of the architecture of a satellite TTC remote control receiver according to the prior art.

FIG. 1 describes the architecture of a TTC receiver 10 according to the prior art. It comprises at least one radiofrequency gain chain 101 receiving a signal at a frequency $F_{RF}$, a first frequency mixer 102 which carries out a first frequency transposition of the signal delivered by the gain chain 101 to a first gain chain 103 at intermediate frequency $FI_1$ and a second frequency mixer 104 which carries out a second frequency transposition of the signal delivered by the gain chain 103 at intermediate frequency to a second gain chain 105 at intermediate frequency $FI_2$. The gain chains 101, 103, 105 essentially constitute means for filtering and/or amplifying the signals which they receive at input.

The TTC receiver 10 also comprises a first local fractional frequency synthesis oscillator 106 generating a frequency and a second local integer or fractional frequency synthesis oscillator 107, both adapted to generate synthesized frequencies $F_{OL1}$, $F_{OL2}$ necessary for the two successive transpositions. The double frequency transposition carried out by the two local oscillators 106, 107 is necessary in order to change from a high frequency $F_{RF}$ at the input of the receiver to a lower frequency $FI_2$ at the input of the means 108 for demodulating the signal.

The frequency $FI_1$ is obtained by transposing the frequency $F_{RF}$ by the frequency $F_{OL1}$. The relation between them is:

$$F_{FI1}=F_{RF}-F_{OL1} \text{ if } F_{RF}>F_{OL1}, \quad (1)$$

$$\text{or } F_{FI1}=F_{OL1}-F_{RF} \text{ if } F_{RF}<F_{OL1}. \quad (2)$$

The frequency $FI_2$ is obtained by transposing the frequency $FI_1$ by the frequency $F_{OL2}$. The relation between them is:

$$F_{FI2}=F_{FI1}-F_{OL2} \text{ if } F_{FI1}>F_{OL2}, \quad (3)$$

$$\text{or } F_{FI2}=F_{OL2}-F_{FI1} \text{ if } F_{FI1}<F_{OL2}. \quad (4)$$

For the sake of simplicity, the remainder of the description is based on relations (1) and (4), given that the invention applies identically to the case in which relations (2) and (3) are applied.

Thus, by combining relations (1) and (4), the expression $F_{RF}=F_{OL1}+F_{OL2}-F_{FI2}$ (5) is obtained.

The demodulating means 108 function with an input signal at fixed frequency, and the frequency $F_{FI2}$ is therefore a constant imposed by the specifications of the system.

The receiver operates over a wide frequency band: $F_{RFmin}<F_{RF}<F_{Rfmax}$.

Figure 2:
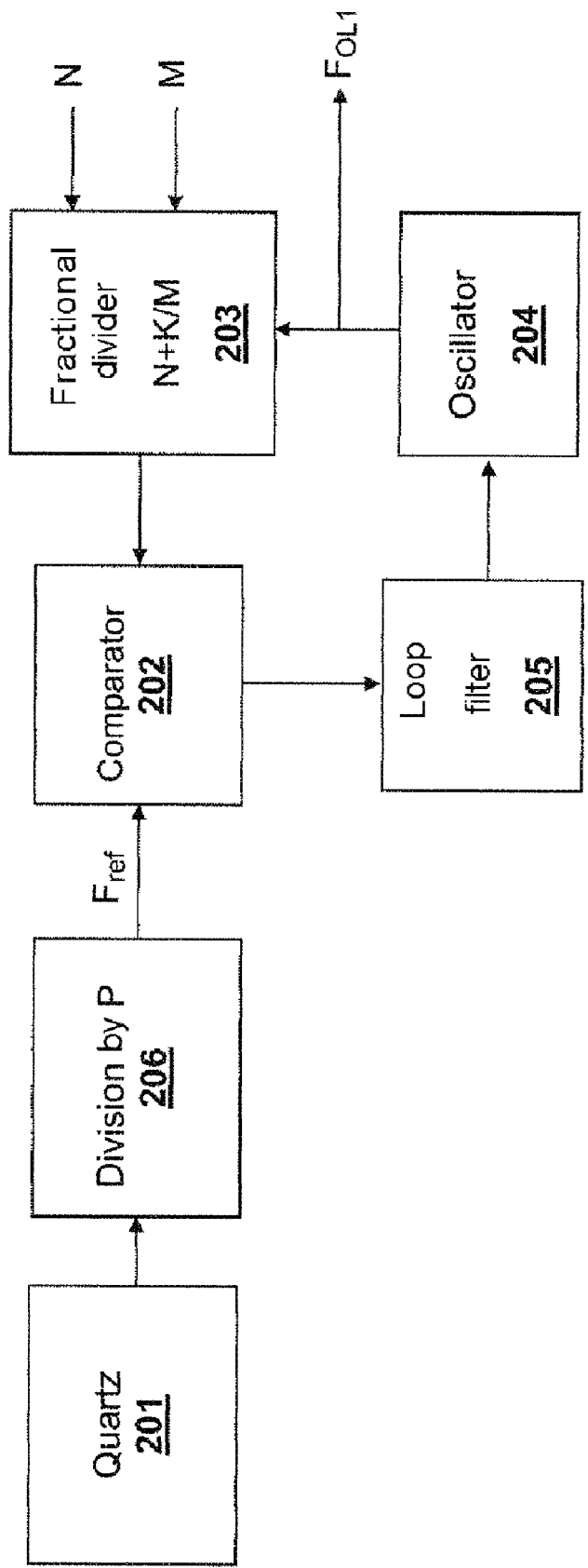
FIG. 2 represents a block diagram of a local fractional synthesizer oscillator according to the prior art.

FIG. 2 schematizes the architecture of a local fractional synthesis oscillator according to the prior art.

A local fractional synthesis oscillator 106 comprises at least the following elements. A quartz oscillator 201 delivers a fixed reference frequency $F_{REF}$, optionally divided beforehand 206 by a factor P, to a comparator 202. A fractional divider 203 carries out frequency division in the ratio N+K/M, where N and K are programmable parameters and M is the fractional coefficient of the synthesizer 106 (0<K<M). A comparator 202 ensures equality between the frequency $F_{REF}$ and the frequency $F_{OL1}/(N+K/M)$ in order to establish the following relation: $F_{OL1}=F_{REF}\times(N+K/M)$. The local fractional synthesis oscillator furthermore comprises a loop filter 205, a function of which is to filter the phase noise and the possible parasitic lines, and a voltage controlled oscillator 204.

FIG. 3 illustrates a numerical application example for the generation of the frequency $F_{OL1}$ lying between 3000 and 4000 MHz based on a reference frequency $F_{REF}$ of 50 MHz and a parameter M=100000.

In this example, N lies between 60 and 80, and K between 0 and 99999.

The frequency increment of the local oscillator is 500 Hz.

N and K are two control parameters of the local oscillator.

The architecture of a fractional synthesizer according to the prior art, as described in FIG. 1, has certain limitations. Owing to interaction between the frequency $F_{OL1}$ and the comparison frequency $F_{REF}$, there is a known phenomenon of creating parasitic lines which degrade the spectral purity of the signal generated by the fractional synthesizer. These parasitic lines are produced on either side of the frequency $F_{OL1}$ at a frequency distance equal to $\Delta F=\pm|F_{OL1}-(A\cdot F_{REF})|$, with $(A\cdot F_{REF})$ the value which is a multiple of $F_{REF}$ lying closest to $F_{OL1}$, A being a positive integer and $||$ denoting the absolute value of a number.

The last column of the table in FIG. 3 indicates the frequencies of the parasitic lines observed for different frequency values $F_{OL1}$ in a useful frequency band lying between 3 GHz and 4 GHz and a fixed frequency $F_{REF}$ equal to 50 MHz. The table of FIG. 3 represents only a few examples of frequency values $F_{OL1}$ which it is possible to generate. It can be seen that the frequencies of the parasitic lines coincide with the frequency $F_{OL1}$ when it is equal to a multiple of the frequency $F_{REF}$. When $F_{OL1}$ is not equal to a multiple of the frequency $F_{REF}$, two parasitic lines appear on either side of the frequency $F_{OL1}$, these become commensurately further away from it as the value of the frequency $F_{OL1}$ moves away from a multiple of the frequency $F_{REF}$ and approaches a multiple of the frequency $F_{REF}/2$. In the numerical example of FIG. 3, the frequency distance between the frequency $F_{OL1}$ and the parasitic lines is greatest for $F_{OL1}$=3025 MHz. The parasitic lines are localized around frequencies which are multiples of the frequency $F_{REF}$.

The loop filter 205 of the fractional synthesizer 106 has, in particular, the function of filtering the phase noise and the parasitic lines. The filtering performances are regulated as a function of a loop band parameter which is expressed in Hertz. This parameter is at least fixed so as to optimize at least the phase noise level of the local oscillator. The parasitic lines are also filtered by the loop filter 205 to a level acceptable for operation of the TTC receiver when the distance $\Delta F$ between a parasitic line and the frequency $F_{OL1}$ is more than X times the loop band of the fractional synthesizer 104. By way of example, the number X may be taken equal to 10. The parameter X is an integer or non-integer number, and is regulated as a function of the tolerance of the receiver to the perturbations associated with the parasitic lines.

Figure 4:
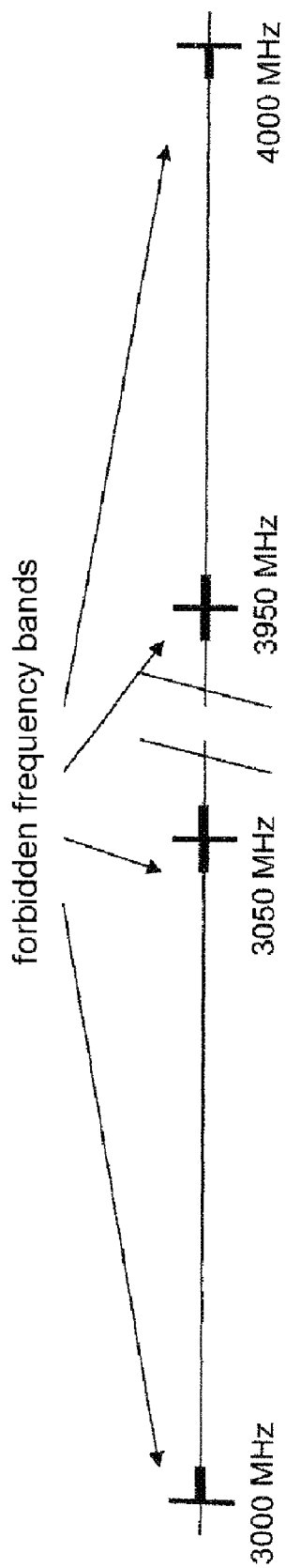
FIG. 4 represents an example of frequency bands not usable by a fractional synthesizer.

Returning to the numerical example of FIG. 3, and for a loop band B equal to 250 kHz, the parasitic lines detrimental to the TTC receiver lie in frequency bands of ±2.5 MHz every 500 MHz, which corresponds to 10% of the total band. These frequency bands thus represent forbidden bands in which it is not possible to generate a frequency $F_{OL1}$ without the appearance of parasitic lines. Thus, the use of a fractional synthesizer does not make it possible to cover the entire desired frequency band continuously with an acceptable level of degradation. In general, the fractional synthesizer will not function correctly for frequencies $F_{OL1}$ lying in bands of width $2B\cdot X$ centered around frequencies $A\cdot F_{REF}$, with A a strictly positive integer. FIG. 4 schematizes the frequency distribution of the forbidden bands for the numerical applications indicated in FIG. 3.

The operating frequency band $F_{RF}$ of the TTC receiver is associated with the band covered by the fractional synthesizer 106 by the following relation $F_{RF}=F_{OL1}+F_{OL2}-F_{FI2}$. The forbidden or unusable bands of such a fractional synthesizer 106 affect the useful input band of the TTC receiver.

Figure 5:
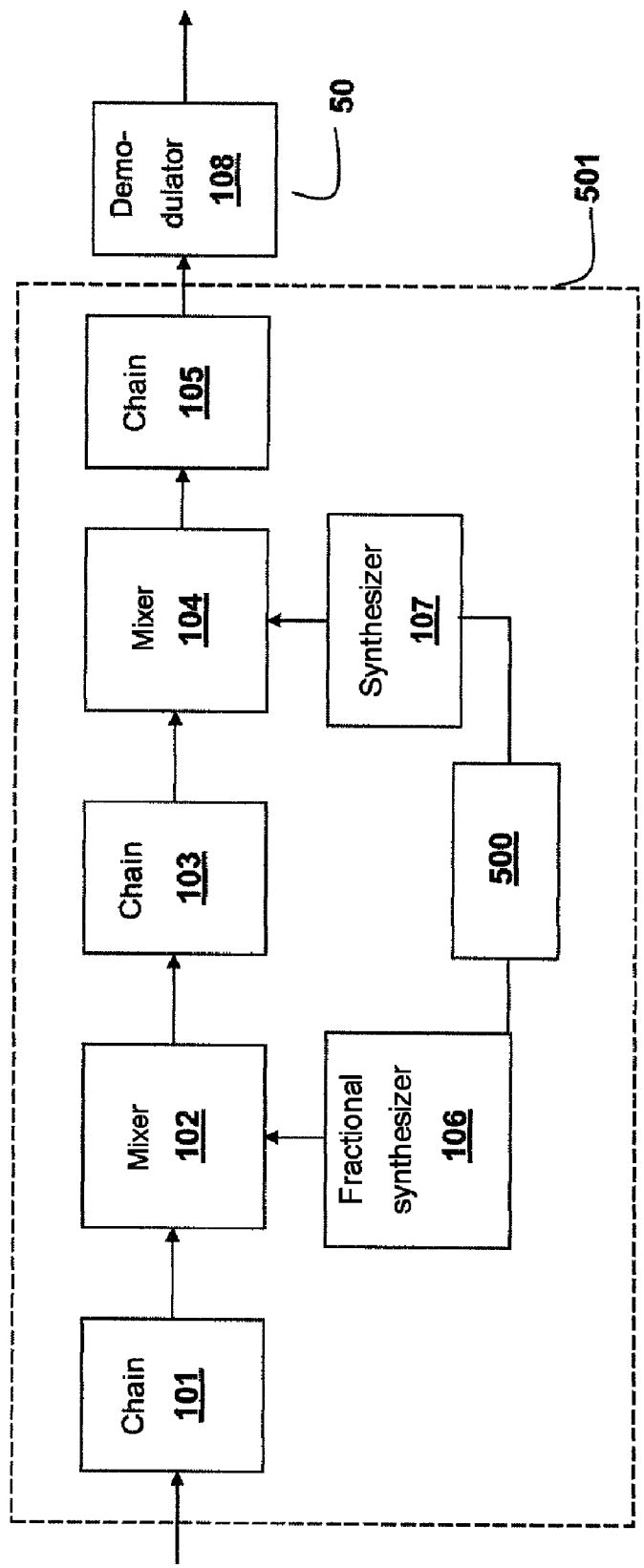
FIG. 5 represents a block diagram of the architecture of a satellite TTC remote control receiver according to the invention.

In order to resolve this problem, the TTC receiver according to the invention comprises, in addition to the elements already mentioned with reference to FIG. 1, a frequency control device 500 as represented in FIG. 5, the function of which is to determine suitable frequencies of each synthesizer 106, 107 in order to be able to cover the entire desired frequency band continuously at the input of the TTC receiver without having to avoid the forbidden frequency bands mentioned above. The forbidden bands of the first fractional synthesizer 106 are avoided by an appropriate change of the frequency of the second synthesizer 107, which is adapted to generate at least two separate frequencies $F_{OL2,A}$ and $F_{OL2,B}$, the frequency difference of which is strictly greater than the width of a forbidden band, that is to say 2B·X, or 5 MHz with the numerical values used for the example of FIG. 3. The second synthesizer 107 is preferably a local integer synthesis oscillator, although it might also be a local fractional synthesis oscillator.

The architecture of a TTC receiver according to the invention is illustrated in FIG. 5. In addition to the elements already described with reference to FIG. 1, this receiver comprises a device 500 which makes it possible to control the frequencies $F_{OL1}$ and $F_{OL2}$. For a given pair of frequencies ($F_{RF}$, $F_{FI2}$), the device 500 according to the invention carries out the following steps.

The frequency of the second synthesizer 107 is initially fixed at its first value $F_{OL2}=F_{OL2,A}$.

The value of the frequency $F_{OL1}$ of the first fractional synthesizer 106 is determined on the basis of relation (5) $F_{RF}=F_{OL1}+F_{OL2}-F_{FI2}$ in the case in which $F_{RF}>F_{OL1}$ and $F_{FI1}<F_{OL2}$. Three other cases may occur.

If $F_{RF}>F_{OL1}$ and $F_{FI1}>F_{OL2}$, then $F_{RF}=F_{OL1}+F_{OL2}+F_{FI2}$ (6)

If $F_{RF}<F_{OL1}$ and $F_{FI1}>F_{OL2}$, then $F_{RF}=F_{OL1}-F_{OL2}-F_{FI2}$ (7)

If $F_{RF}<F_{OL1}$ and $F_{FI1}<F_{OL2}$, then $F_{RF}=F_{OL1}-F_{OL2}+F_{FI2}$ (8)

If the value obtained for $F_{OL1}$ by applying relations (5), (6), (7) or (8) coincides with a value contained in a forbidden band, i.e. a band of width 2B·X centered on a frequency of value A·$F_{REF}$, said band being contained in the useful input frequency band [$F_{RFmin}$, $F_{Rfmax}$] of the receiver, then, and in this case only, the frequency of the second synthesizer 107 is modified and assigned to its second value $F_{OL2}=F_{OL2,B}$. This second value has at least a distance of more than 2B·X and less than $F_{REF}$−2B·X from the first value. The result is thus that generation of the frequency $F_{OL1}$ in a forbidden band is avoided while allowing the receiver to remain compatible with the frequency pair ($F_{RF}$, $F_{FI2}$) imposed by constraints associated with the system. More generally, the condition to be satisfied by the frequency $F_{OL2,B}$ is that the choice of its value makes it possible to avoid the value of the frequency $F_{OL1}$ coinciding with a value lying in a forbidden band, that is to say a value contained in a frequency band of lower bound A·$F_{REF}$−B·X and upper bound A·$F_{REF}$+B·X. This condition is expressed generally by the following two inequalities, which have to be satisfied together:

$$|F_{OL2,B}-F_{OL2,A}|>AF_{REF}+2B\cdot X$$

$$|F_{OL2,B}-F_{OL2,A}|<AF_{REF}-2B\cdot X$$

with A being a positive integer or zero.

The device 500 according to the invention carries out the preceding steps for a given pair of frequencies ($F_{RF}$, $F_{FI2}$) in order to generate the appropriate frequencies ($F_{OL1}$, $F_{OL2}$).

In an alternative embodiment of the invention, relations (5), (6), (7) and (8) are pre-executed in order to generate a table, such as the one illustrated in FIG. 6, which contains the associated pair ($F_{OL1}$, $F_{OL2}$) for each pair of frequencies ($F_{RF}$, $F_{FI2}$).

The device 500 is a digital integrated circuit, for example a programmable logic component, a read-only memory or any other device making it possible to deliver frequency control of the synthesizers 106, 107 at its output.

The control device 500, associated with the two frequency synthesizers 106, 107 and with the three gain chains 101, 103, 105, constitutes a double frequency transposition device 500 according to the invention.

FIG. 6 presents in a table the respective values of the frequencies $F_{OL1}$ and $F_{OL2}$ which are generated by each frequency synthesizer of the TTC receiver according to the invention, in order to be able to cover the entire input frequency range $F_{RF}$ of the receiver without discontinuity and in the case in which relation (5) applies. The example of FIG. 6 relates to a useful input band of the receiver lying between 4000 and 4500 MHz with a second synthesizer adapted to generate, for example, either the frequency $F_{OL2,A}$=900 MHz or the frequency $F_{OL2,B}$=910 MHz. The constraint to be satisfied for the choice of these two frequencies is that the difference between them is greater than 5 MHz and less than 45 MHz. Other choices of frequency are possible, so long as the aforementioned constraints are satisfied, this being with the aim of circumventing the generation of a frequency $F_{OL1}$ lying in a forbidden band while guaranteeing continuity in the coverage of the input frequency band.

The invention claimed is:

1. A device for double frequency transposition, comprising at least one first amplification and/or filtering chain receiving a signal at a first frequency $F_{RF}$, a first frequency mixer which carries out a first frequency transposition of said signal to a first intermediate frequency $F_{FI1}$ and delivers said transposed signal to the input of a second amplification and/or filtering chain, a second frequency mixer which carries out a second transposition of the signal delivered by said second chain to a second intermediate frequency $F_{FI2}$ and delivers said transposed signal to the input of a third amplification and/or filtering chain, a first fractional frequency synthesizer of loop band B adapted to produce a first synthesized frequency $F_{OL1}$ at the input of said first mixer and a second integer or fractional frequency synthesizer adapted to produce a second synthesized frequency $F_{OL2}$ at the input of said second mixer, and further comprising means for controlling the frequencies $F_{OL1}$, $F_{OL2}$ of said first and second synthesizers, which are adapted to carry out the following steps:

initializing the frequency $F_{OL2}$ at a first given value $F_{OL2,A}$, for a given pair of frequencies $F_{RF}$, $F_{FI2}$, determining the frequency $F_{OL1}$ with the aid of the following relations:

if $F_{RF}>F_{OL1}$ and $F_{FI1}<F_{OL2}$, $F_{RF}=F_{OL1}+F_{OL2}-F_{FI2}$ (5), if $F_{RF}>F_{OL1}$ and $F_{FI1}>F_{OL2}$, $F_{RF}=F_{OL1}+F_{OL2}+F_{FI2}$ (6), if $F_{RF}<F_{OL1}$ and $F_{FI1}>F_{OL2}$, $F_{RF}=F_{OL1}-F_{OL2}-F_{FI2}$ (7), if $F_{RF}<F_{OL1}$ and $F_{FI1}<F_{OL2}$, $F_{RF}=F_{OL1}-F_{OL2}+F_{FI2}$ (8), if the value obtained for $F_{OL1}$ lies in a frequency band of lower bound $A \cdot F_{REF} - B \cdot X$ and upper bound $A \cdot F_{REF} + B \cdot X$, where A is a strictly positive integer and X is a given parameter, modifying the frequency $F_{OL2}$ to a second value $F_{OL2,B}$ determined so that the difference in absolute value between $F_{OL2,A}$ and $F_{OL2,B}$ satisfies the following two conditions:

$$|F_{OL2,B} - F_{OL2,A}| > AF_{REF} + 2B \cdot X$$

$$|F_{OL2,B} - F_{OL2,A}| < AF_{REF} - 2B \cdot X$$

and transmitting the frequency values $F_{OL1}$ and $F_{OL2}$ to said frequency synthesizers.

2. The double frequency transposition device as claimed in claim 1, wherein said means for controlling the frequencies $F_{OL1}$, $F_{OL2}$ are adapted to carry out initially, for a set of given frequency pairs $F_{RF}$, $F_{FI2}$, said calculation steps for determining the associated values of the frequencies $F_{OL1}$, $F_{OL2}$ of said frequency synthesizers and to record the set of frequencies $F_{RF}$, $F_{FI2}$, $F_{OL1}$, $F_{OL2}$ obtained in a memory which they comprise.

3. The double frequency transposition device as claimed in claim 2, wherein said means for controlling the frequencies $F_{OL1}$, $F_{OL2}$ are formed by an integrated circuit of the ASIC or FPGA type comprising at least one memory.

4. A remote control receiver for a geostationary satellite, comprising at least means for demodulating a signal at the intermediate frequency $F_{FI2}$ and a double transposition device as claimed in claim 1, which receives a signal at the frequency $F_{RF}$ and delivers said transposed signal at the intermediate frequency $F_{FI2}$.

* * * * *